3,058,951
COMPOSITION COMPRISING AN EPOXY RESIN, A POLYVINYL ACETAL RESIN, AND A POLY-ACRYLATE RESIN, AND AN ARTICLE COATED THEREWITH
Ralph G. Flowers, Pittsfield, Mass., William H. Butt, East Chatham, N.Y., and John G. Howe, Windsor, Mass., assignors to General Electric Company, a corporation of New York
No Drawing. Filed June 23, 1959, Ser. No. 822,192
8 Claims. (Cl. 260—45.5)

The present invention relates to a synthetic resin coating composition, and more particularly to such a composition which is adapted to be applied on metallic parts to produce thereon a protective coating having excellent mechanical and electrical properties and which is particularly suitable for application to electrical apparatus and accessories thereof.

Coating material of a variety of compositions has heretofore been used to protectively coat electrical apparatus exposed to atmospheric conditions, such as the casings and covers of transformers, to retard corrosion of the metallic parts and guard against short circuits such as caused by the presence of foreign objects or animals. Prior materials of this type have included, for example, liquid paints of synthetic resin or other composition which usually are applied by spraying, flowing, or brushing methods. However, the coating compositions heretofore used for the above purposes have not been fully satisfactory for a number of reasons. In some cases, the coating layers produced were too thin to afford adequate resistance to mechanical abrasion or impact or to provide a sufficiently high level of electrical insulation, and consequently multi-layer coatings applied by relatively prolonged and uneconomical methods were often required to overcome these difficulties. In other cases, the coating compositions offered unsatisfactory resistance to corrosion, especially in the crevices and corners of the coated articles. A further fault of the prior coating compositions resided in the inadequate adhesion of the applied film which permitted corrosion, once started in an area of the article, to creep to other surface portions underneath the coating layer.

It is an object of the invention to provide a novel composition of matter which is especially suitable as a protective coating material for metallic parts and which avoids the above disadvantages of known coating compositions.

It is still another object of the invention to provide a synthetic resin material which produces on metallic parts a tightly adherent, uniform coating having superior mechanical, chemical and electrical insulation properties and has particular utility for application to electrical apparatus and accessories thereof.

Still another object of the invention is the provision of a coating composition of the above type which is particularly suitable for use in coating metallic articles by means of a fluidized coating bed.

The technique of coating articles in fluidized beds is well known in the art, and, generally speaking, involves the immersion of a heated metallic article into a receptacle containing a mass of finely divided solid particles, usually of synthetic resin composition, which are maintained in a dense turbulent condition by means of a gaseous stream continuously introduced into the receptacle. As a result, a coating of resin particles which is partially fused is deposited on the heated surface of the immersed article which is then completely fused and hardened by suitable curing procedures.

It has been found in accordance with the present invention that an excellent protective coating may be produced on metallic parts by a composition comprising the reaction product of a mixture of an epoxy resin, a polyvinyl acetal resin, and a polyacrylate resin. When this composition, as more fully described below, is applied to metallic parts, particularly by a fluidizing coating process, there is obtained a coating thereon having a desirable combination of properties including high dielectric strength, excellent solvent resistance, uniform thickness, and markedly improved mechanical impact and abrasion resistance, as compared to similarly produced protective coatings of prior known compositions.

The epoxy resins which may be used in practicing the present invention, which are also known as epoxide or ethoxyline resins, are described, for example in U.S. Patent 2,324,483, Castan, as comprising the product of reaction of a phenol having at least two phenolic hydroxy groups and an epihalogenohydrin, e.g., epichlorohydrin, in which the said product contains at least two ethylene oxide groups.

The epoxy resins, which may be defined generally as being complex epoxide resins comprising a polyether derivative of a polyhydric organic compound containing epoxy groups, are also disclosed in various places in the art. Among such references may be mentioned, in addition to the aforesaid Castan Patent 2,324,483, Castan 2,444,333, British Patent 518,057, and British Patent 579,698. For the most part, these epoxy resins are based on the resinous product of reaction between the epihalogenohydrin, for instance, epichlorohydrin, and a phenol having at least two phenolic hydroxy groups, for example bis-(4-hydroxy-phenyl) dimethylmethane. U.S. Patents 2,494,295, 2,500,600 and 2,511,913, also describe examples of epoxy resinous compositions which may be employed in the practice of the present invention. By reference, the aforementioned patents are intended to be part of the present description of the epoxy resins used and, for brevity, the epoxy resins will not be described other than that they contain more than one ethylene oxide group, e.g., from 1 to 2 or more epoxide groups per molecule, and are prepared by effecting reaction between a polyhydric phenol, for example, hydroquinone, resorcinol, and condensation products of phenols with ketone, for instance, bis-(4-hydroxyphenyl)-2,2-propane, with epichlorohydrin. For example, the reaction of epichlorohydrin with bis-(4-hydroxyphenyl)-2,2-propane may be formulated as follows:

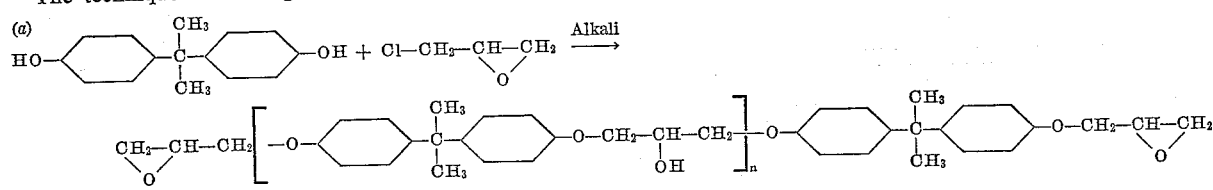

where $n$ has an average value varying from around zero to about 7. Many of these epoxy resins are sold under the name of Epon resins, or Araldite resins. Another type of epoxy resin suitable for use in the present invention is sold under the name Cardolite. The latter is an epoxy resin derived from a mixture of poly(hydroxyphenyl) pentadecanes, a major constituent of the latter being:

(b)

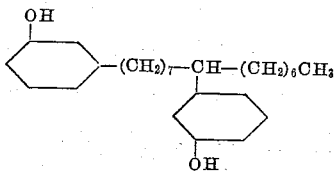

Data on the Epon resins are given in the table below, all of the resins listed being believed to have the composition as set forth in Formula $a$ above:

TABLE I

| Epon No. | Epoxide Equivalent | Approximate Esterification Equivalent | M.P., °C. |
|---|---|---|---|
| 1001 | 450–525 | 130 | 64–76 |
| 1004 | 905–985 | 175 | 97–103 |
| 1007 | 1,600–1,900 | 190 | 127–133 |
| 1009 | 2,400–4,000 | 200 | 145–155 |

These complex resins contain epoxide groups or epoxide and hydroxyl groups as their functional groups and are generally free from other functional groups such as basic and acidic groups. It will be noted that in actual practice it is necessary to react these resins with a hardener or catalyst for the purpose of effecting a cure thereof to a solid usable state.

The polyvinyl acetal resin component of the present composition may be made in accordance with conventional methods from polyvinyl acetate by a hydrolysis reaction followed by reaction with an aldehyde to form the acetal. Such methods are disclosed, for example, in U.S. Patent 2,307,588. The polyvinyl acetals are generally made with the lower aldehydes, such as formaldehyde, acetaldehyde and butyraldehyde, to form polyvinyl formal, polyvinyl acetal and polyvinyl butyral. Polyvinyl formal and polyvinyl butyral are the commonest commercially available polyvinyl acetal resins, and are preferred for use in the invention.

The polyacrylate resin component of the present invention may be any of the polymers or co-polymers of esters of acrylic or methacrylic acids, and the expression "polyacrylate resin" as used in the claims means a resin as thus defined. Examples of such esters are methylacrylate, methylmethacrylate, ethylacrylate, ethylmethacrylate, butylacrylate, isobutylacrylate, butylmethacrylate, and isobutylmethacrylate. Such compounds may be produced, for example, by the esterification of acrylic acids and polymerization of the esters, in accordance with processes well-known and commonly used in the art. Such processes are described, for example, in the text by Ellis, The Chemistry of Synthetic Resins, published by Reinhold Publishing Corporation, New York City, 1935, vol. II.

The synthetic coating material of the present invention has the following approximate suitable and preferred ranges of composition, the proportions being given in percent by weight:

|  | Suitable, percent | Preferred, percent |
|---|---|---|
| Epoxy Resin | 25–94 | 65–85 |
| Polyvinylacetal Resin | 1–25 | 4–10 |
| Polyacrylate Resin | 5–70 | 10–25 |

The following are examples of compositions of the present invention which have produced hard, tough thermoset protective coatings on metallic parts which are characterized by excellent solvent resistance, good mechanical impact and abrasion properties, and excellent electrical insulation qualities making them suitable for high voltage conditions. Of these examples, the composition of Example I is particularly preferred. It will be understood that the invention is not intended to be limited to the particular compounds or proportions thereof recited, since the examples are given merely for the purpose of illustration:

*Example I*

|  | Percent |
|---|---|
| Epoxy resin (905–985) | 75.5 |
| Polyvinyl formal | 5.6 |
| Polybutylacrylate | 18.9 |

The above composition to which about 3% dicyandiamide was added for curing the epoxy resin and a small amount of colloidal $SiO_2$ was incorporated to condition the material for fluidized coating operations produced an extremely satisfactory protective coating on a metal panel having a dielectric strength of 1100 volts per mil in a 9 mil film and other desirable properties as described in the comparative tests set forth below. The number following the epoxy resin in these examples is the epoxide equivalent.

*Example II*

|  | Percent |
|---|---|
| Epoxy resin (1600–1900) | 92.0 |
| Polybutylmethacrylate | 5.7 |
| Polyvinyl formal | 2.3 |

*Example III*

|  |  |
|---|---|
| Epoxy resin (1600–1900) | 35.8 |
| Polybutylmethacrylate | 53.5 |
| Polyvinyl formal | 7.1 |

*Example IV*

|  |  |
|---|---|
| Epoxy resin (905–985) | 86.0 |
| Polybutylmethacrylate | 5.4 |
| Polyvinyl formal | 8.6 |

*Example V*

|  |  |
|---|---|
| Epoxy resin (1600–1900) | 34.8 |
| Epoxy resin (905–985) | 34.8 |
| Polyvinylbutyral | 17.4 |
| Polybutylmethacrylate | 13.0 |

*Example VI*

|  |  |
|---|---|
| Epoxy resin (905–985) | 78.5 |
| Polybutylmethacrylate | 19.6 |
| Polyvinyl formal | 1.9 |

*Example VII*

|  |  |
|---|---|
| Epoxy resin (450–525) | 69.6 |
| Polybutylmethacrylate | 17.4 |
| Polyvinyl formal | 13.0 |

*Example VIII*

|  |  |
|---|---|
| Epoxy resin (1600–1900) | 55.5 |
| Epoxy resin (420–Cardolite) | 18.5 |
| Polybutylmethacrylate | 18.5 |
| Polyvinyl formal | 7.5 |

*Example IX*

|  |  |
|---|---|
| Epoxy resin (905–985, oil modified) | 37.0 |
| Epoxy resin (905–985) | 37.0 |
| Polybutylmethacrylate | 18.5 |
| Polyvinyl formal | 7.5 |

*Example X*

|  |  |
|---|---|
| Epoxy resin (905–985) | 74.0 |
| Polybutylmethacrylate | 18.5 |
| Polyvinyl formal | 7.5 |

Example XI

| | |
|---|---|
| Epoxy resin (905–985) | 74 |
| Polyethylmethacrylate | 18.5 |
| Polyvinylbutyral | 7.5 |

Example XII

This composition is the same as that in Example XI except that polymethyl methacrylate was substituted for the polyethylmethacrylate.

Example XIII

This composition is the same as that in Example XI except that polyisobutylacrylate was used instead of the polyethylmethacrylate.

Example XIV

This is the same composition as Example XI except that a co-polymer of butylmethacrylate and isobutylmethacrylate was substituted for the polyethylmethacrylate.

Many of the above compositions were further modified by the addition of a small amount of pigment, it being found convenient to incorporate the pigment using a small amount of a liquid epoxy resin to form a color concentrate paste of the pigment material and then adding the paste to the remaining components. Also, as already indicated, a small amount of an inorganic inert filler such as colloidal silicon dioxide, was used in many of the above compositions to adapt them for optimum use in fluidized coating processes. In general, an amount of 1 to 10 percent of dicyandiamide by weight of the epoxy resin has been found particularly satisfactory as an epoxy resin curing agent in the above compositions. However, other known catalysts may be used for this purpose, such as anhydride types of catalysts, e.g., maleic anhydride, chlorendic anhydride, and pyromellitic dianhydride; amine types of epoxy catalysts, e.g., p,p$^1$-methylene dianiline, ethylene diamine, diethylene triamine, piperidine, and the like; and such catalysts as boron trifluoride amine complexes. The amount of catalyst used in the described composition will vary widely depending on the equivalent weight and chemical activity of the particular catalyst used.

In a typical process of preparing and applying the coating material, the three principal components, which are solids, are either separately or together supplied to a two-roll mill or dough mixer heated to about 120° C., and continuously operated to blend the components into a homogeneous plastic mass. In those cases where pigment is to be incorporated, the pigment material, in the form of a paste made by mixing it with a liquid epoxy resin, is introduced into the resin blend at this stage and mixed therewith by the mill or dough mixer. The melt thus obtained is then cooled to room temperature and crushed to obtain a small particle size. The catalyst, e.g., dicyandiamide, in powder form is then added to the crushed resin, and the combined material is mixed and ground to a fine powder by a suitable grinder. At this stage, an inert filler material such as colloidal silicon dioxide is added. The powder is then fluidized in a fluidizing apparatus in accordance with well-known procedures, and a metal part, pre-heated to about 200° C., is immersed in the fluidized powder mass. After being held therein for a predetermined period depending on the thickness of coating desired, the coated metal part is withdrawn and placed in an oven at about 200° C. until final curing is achieved (usually about 10 minutes).

Tests were made to determine the characteristics of the coating composition of the present invention consisting of our three component system as compared to various other types of epoxy resin-containing coating compositions. In these tests the composition of Example I above was employed for comparison with compositions having (*a*) epoxy resin alone, (*b*) the combination of epoxy resin with 11% polyvinyl formal, and (*c*) the combination of epoxy resin with 20% polybutylacrylate. The same type of epoxy resin was used for all of these compositions. Each of the test compositions also contained about 4–5% of dicyandiamide by weight of the epoxy resin, and a small amount of colloidal silicon dioxide (less than 3% of the total weight) to make it suitable for a fluidized coating application.

The test resin compositions were reduced to powder and then applied by a fluidizing process onto steel panels under the same conditions to produce a coating layer of 10 mils. Observation of the finished products showed that the resin of Example I provided a substantially more uniform and smoother coating than any of the other resins, with resin (*b*), which lacked a polyacrylate, producing the poorest coating in appearance, being characterized by an extremely uneven and bumpy coating surface.

In a solvent resistance test in which the respective samples were immersed in a 50–50 mixture of ethyl acetate and benzene for one week and then dried, the composition of Example I was the only coating which remained substantially free of the mottling, blistering and raised areas characterizing the coatings of the other compositions. In this test, resin (*c*) which lacked a polyvinyl acetal, gave the poorest results.

Duplicates of the original panels were tested for scrape abrasion resistance using a $\frac{1}{16}''$ scraping ball weighted with 1550 grams. This test involved determining the number of strokes of the scraping ball required to wear the coated panel down to the bare metal, as shown by the completing of an electrical circuit when this point was reached. The coating of Example I withstood 3000 strokes, resin (*c*) 1500 strokes, resin (*b*) 600 strokes, and resin (*a*) 600 strokes, showing a marked superiority of the present 3-component composition in abrasion resistance to the one- and two-component compositions tested.

Impact tests made on the test panels also showed the superiority of the present 3-component composition over all the other materials, it being found that the coating of the present composition was not chipped at the impact area as were all the other coatings in a test using a falling weight of 10 lbs. with a $\frac{1}{2}''$ ball contact raised to heights of from 10 inches up to 17 inches. Resin (*a*) produced the lowest results in this test, and was characterized by a lifting of the coating from the substrate immediately surrounding the area of impact.

It will be evident, therefore, that the three-component synthetic resin composition of the present invention provides a coating material having an extremely desirable combination of electrical, chemical and mechanical properties making it suitable for a wide variety of applications, and particularly where deterioration due to physical impact or abrasion effects and corrosion is a substantial problem in the maintenance of electrical equipment. The described material may, for example, be beneficially used for coating containers, brackets, hangers and the like of such equipment as transformers, capacitors, cutouts, and switchgear.

As indicated, the described composition provides especially good results when applied by means of a fluidized coating process. However, the invention is not so limited, and satisfactory results can be obtained on any substrate material by other applications, such as by spraying or brushing or otherwise applying the described composition dissolved or dispersed in suitable solvent or other vehicle, such as acetone-ethylene dichloride. In a typical example, 30 parts of the resin of Example IX were dissolved in 30 parts acetone—90 parts ethylene dichloride. A good spray coating of about 0.5 mil resulted. This coating was air dried for 30 minutes and cured for 30 minutes at 160° C. to give a tough, durable finish.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. A composition of matter comprising (1) an epoxy resin comprising the reaction product of a polyhydric phenol and an epihalohydrin, (2) a polyvinyl acetal resin, and (3) a polyacrylate resin selected from the group consisting of homopolymers and copolymers of esters selected from the group consisting of methylacrylate, methylmethacrylate, ethylacrylate, ethylmethacrylate, butylacrylate, isobutylacrylate, butylmethacrylate, and isobutylmethacrylate.

2. A composition of matter comprising (1) 25–94% by weight of an epoxy resin comprising the reaction product of a polyhydric phenol and an epihalohydrin, (2) 1–25% of a polyvinyl acetal resin, and (3) 5–70% of a polyacrylate resin selected from the group consisting of homopolymers and copolymers of esters selected from the group consisting of methylacrylate, methylmethacrylate, ethylacrylate, ethylmethacrylate, butylacrylate, isobutylacrylate, butylmethacrylate, and isobutylmethacrylate.

3. A coating composition for producing on metal surfaces a hard, tough, intimately adhering electrically insulating coating having high mechanical and solvent resistance comprising (1) 25–94% by weight of an epoxy resin comprising the reaction product of a polyhydric phenol and an epihalohydrin, (2) 1–25% of a polyvinyl acetal resin, (3) 5–70% of a polyacrylate resin, selected from the group consisting of homopolymers and copolymers of esters selected from the group consisting of methylacrylate, methylmethacrylate, ethylacrylate, ethylmethacrylate, butylacrylate, isobutylacrylate, butylmethacrylate, and isobutylmethacrylate, and (4) 1–10% of dicyandiamide by weight of the epoxy resin.

4. A coating composition for producing on metal surfaces a hard, tough, intimately adhering electrically insulating coating having high mechanical and solvent resistance comprising (1) 65–85% by weight of an epoxy resin comprising the reaction product of a polyhydric phenol and an epihalohydrin, (2) 4–10% of a polyvinyl acetal resin, and (3) 10–25% of a polyacrylate resin selected from the group consisting of homopolymers and copolymers of esters selected from the group consisting of methylacrylate, methylmethacrylate, ethylacrylate, ethylmethacrylate, butylacrylate, isobutylacrylate, butylmethacrylate, and isobutylmethacrylate.

5. A composition of matter comprising the reaction product of (1) an epoxy resin comprising the reaction product of a polyhydric phenol and an epihalohydrin, (2) a polyvinyl acetal resin, and (3) a polyacrylate resin selected from the group consisting of homopolymers and copolymers of esters selected from the group consisting of methylacrylate, methylmethacrylate, ethylacrylate, ethylmethacrylate, butylacrylate, isobutylacrylate, butylmethacrylate, and isobutylmethacrylate.

6. A composition of matter comprising the reaction product of (1) 25–94% by weight of an epoxy resin comprising the reaction product of a polyhydric phenol and an epihalohydrin, (2) 1–25% of a polyvinyl acetal resin, and (3) 5–70% of a polyacrylate resin selected from the group consisting of homopolymers and copolymers of esters selected from the group consisting of methylacrylate, methylmethacrylate, ethylacrylate, ethylmethacrylate, butylacrylate, isobutylacrylate, butylmethacrylate, and isobutylmethacrylate.

7. An article of manufacture comprising a metal part having on the surface thereof an intimately adherent, hard, tough electrically insulating coating comprising the reaction product of (1) 25–94% by weight of an epoxy resin comprising a reaction product of a polyhydric phenol and an epihalohydrin, (2) 1–25% of a polyvinyl acetal resin, and (3) 5–70% of a polyacrylate resin selected from the group consisting of homopolymers and copolymers of esters selected from the group consisting of methylacrylate, methylmethacrylate, ethylacrylate, ethylmethacrylate, butylacrylate, isobutylacrylate, butylmethacrylate, and isobutylmethacrylate.

8. An article of manufacture comprising a metal part having on the surface thereof an intimately adherent, hard, tough electrically insulating coating comprising the reaction product of (1) 65–85% by weight of an epoxy resin comprising a reaction product of a polyhydric phenol and epihalohydrin, (2) 4–10% of a polyvinyl acetal resin, and (3) 10–25% of a polyacrylate resin selected from the group consisting of homopolymers and copolymers of esters selected from the group consisting of methylacrylate, methylmethacrylate, ethylacrylate, ethylmethacrylate, butylacrylate, isobutylacrylate, butylmethacrylate, and isobutylmethacrylate.

References Cited in the file of this patent

UNITED STATES PATENTS

| | | |
|---|---|---|
| 2,713,567 | Scheibli | July 19, 1955 |
| 2,798,861 | Segall et al. | July 9, 1957 |
| 2,886,473 | Schroeder | May 12, 1959 |